Figure 1:
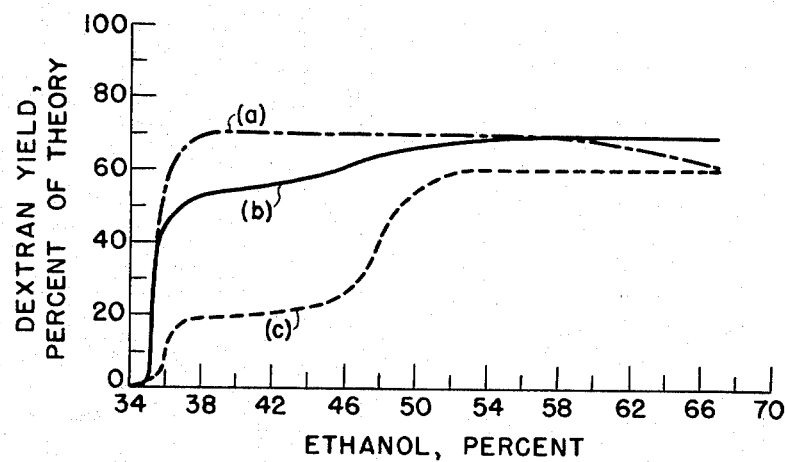

INVENTORS
HENRY M. TSUCHIYA
NISON N. HELLMAN
HAROLD J. KOEPSELL

United States Patent Office 2,724,679
Patented Nov. 22, 1955

2,724,679

SYNTHESIS OF DEXTRAN AND DEXTRAN ANALOGUES OF PREDETERMINED MOLECULAR WEIGHT

Henry M. Tsuchiya and Nison N. Hellman, Peoria, Ill., and Harold J. Koepsell, Grosse Pointe, Mich., assignors to the United States of America as represented by the Secretary of Agriculture Application May 12, 1953, Serial No. 354,664

11 Claims. (Cl. 195—31)

(Granted under Title 35, U. S. Code (1952), sec. 266)

A non-exclusive, irrevocable, royalty-free license in the invention herein described, for all governmental purposes, throughout the world, with the power to grant sub-licenses for such purposes, is hereby granted to the Government of the United States of America.

This invention relates to the synthesis of polysaccharides by means of dextransucrase and associated enzymes by methods involving the control of molecular growth so that the molecular weight of the product may be predetermined. The process of the invention is basically an enzymatic synthesis, i. e., enzymatic conversion of sucrose and certain other sugars to polysaccharides. The products produced are carbohydrate gums that may be called dextrans or dextran-like analogues. They differ from previously known dextrans produced by direct biological synthesis in their characteristic molecular weight. This invention differs from prior methods for producing dextrans in the procedural methods employed for control of the molecular weight of the products.

This application is a continuation in part of application Serial No. 279,204, filed March 28, 1952.

We have determined that, under certain conditions, dextran or dextran-like analogues are synthesized in reaction mixtures containing dextran-sucrase and associated enzymes, sucrose and an alternate glucosyl acceptor, such as isomaltose, maltose, alpha-methylglucoside, and the like as disclosed in our co-pending application, Serial No. 276,035, filed March 11, 1952. As disclosed and claimed in that application such polysaccharide products are of a relatively low molecular weight. The average molecular weight of the polymer formed may be controlled to some degree by employing predetermined concentrations and ratios of sucrose to alternate glucosyl acceptors, which may be sugars or sugar derivatives. In this specification the alternate glucosyl acceptors are also termed "primers." The average molecular weight of the polymers prepared according to that invention may vary from about 4,000 to about 20,000 depending upon the concentrations and ratios of sucrose to alternate glucosyl acceptors. The products resulting from the build up of glucosyl groups upon the accepting molecule may be termed isomaltodextran, maltodextran, etc. according as the alternate glucosyl acceptor is isomaltose, maltose, etc.

We have also determined that low molecular weight dextran is produced when the enzymatic synthesis, or polymerization, is carried out at higher initial levels of sucrose concentration as disclosed in our co-pending application, Serial No. 276,033, filed March 11, 1952. By employing predefined initial sucrose concentrations the average molecular weight of the polymer formed may be controlled within certain limits. In general, the use of initially high sucrose concentrations leads to the formation principally of low molecular weight products; the use of initially low sucrose concentrations leads to the formation principally of high molecular weight products.

When dextran is synthesized using conventional initial sucrose concentrations of approximately 10 to 20 percent and activities of dextransucrase as obtained by processes such as disclosed in patent application, Serial No. 256,586, filed Nov. 15, 1951 by Tsuchiya and Koepsell, and in the absence of added alternate glucosyl acceptors, the molecular weight of the major product isolated is greater than 1 million, although it may vary somewhat with the reaction conditions employed.

Small amounts of dextran with low molecular weight can be isolated from such reaction mixtures, similar to the dextran with low molecular weight obtained in large amounts in reactions conducted at higher initial sucrose concentrations. Experience has shown that a dextran possessing an average molecular weight of 50,000 to 100,000 is suitable as a blood volume expander. In all of the above mentioned processes the synthesis of major amounts of dextran-like products in the molecular weight range of 50,000 to one million is not accomplished. If it is desired to produce dextran with average molecular weight of about 75,000, such high molecular weight dextran of more than one million is conventionally degraded by acid hydrolysis, pyrolysis, enzymatic degradation or by ultrasonic treatment.

We have now determined some of the factors responsible for the difficulty in the progressive build up of polysaccharide chains to intermediate molecular weights, i. e., 50,000 to one million, in those processes in which the products of dextran synthesis has hitherto been restricted to molecular weights lower than 50,000. We have discovered for example that fructose when present in the reaction mixture in the concentrations inherently resulting in dextran synthesis tends to act to hinder molecular growth. Also we have discovered, for example, that the molecular weight of the alternate glucosyl acceptors, among other things, determines its ability to direct and control the average molecular weight of the polymer formed.

We have now developed simple procedures for the synthesis of dextran and its analogues of predetermined molecular weight by employing dextran-like products of relatively low molecular weights as alternate glucosyl acceptors, or primers, in the synthesis reaction involving the three essential components, namely dextransucrase, sucrose and the alternate glucosyl acceptor. According to this invention we employ as primer a glucose polymer such as low molecular weight dextran, e. g. maltodextran and the like, of molecular weight within the range of 5000 to 30,000. We recognize that the nature and concentrations of all three reactants in the synthesis reaction, i. e., primer, sucrose, and enzyme affect the molecular weight and yield of the products formed. Furthermore, we recognize that the changing concentrations of the reactants during the synthesis may affect the polymolecularity of the product formed.

In addition, other reaction variables such as pH and temperature of the reaction may also affect the yield of dextran of desired molecular weight. The enzymatic synthesis may be conducted in the pH range of approximately 4.0 to 7.0, but we prefer to carry out the polymerization in the range of 4.5 to 5.75. The synthetic reaction may be conducted in the temperature range of approximately 4° C. to 37° C. However, we prefer to carry out the synthesis in the range of 10° C. to 20° C. Although the synthesis proceeds more rapidly at higher temperatures, we have found that the lower temperatures favor the formation of intermediate molecular weight polysaccharides and minimize the formation of the higher molecular weight dextran.

Our preferred primer is a low molecular weight dextran of approximately 10,000 to 15,000. Such low molecular weight primer may be produced when the enzymatic polymerization is carried out at high levels of sucrose concentration as disclosed in our co-pending application, Serial No. 276,033, filed March 11, 1952. We may also use the low molecular weight dextran produced enzymatically in the presence of alternate glucosyl acceptors such as maltose or isomaltose, as described in our co-pending application, Serial No. 276,035, filed March 11, 1952. We may also use the low molecular weight fraction obtained by fractional solvent precipitation from the enzymatic polymerization mixture when the polymerization is carried out in this process. Furthermore, we may also employ other polysaccharides as primers, as for example, the polysaccharides obtained by degradation of dextran, starch, glycogen, and other polyglucoses linked through the alpha-glycosidic linkages. As the molecular weight desired for the product increases above 30,000 the ratios of the concentrations of primer to sucrose will decrease. It may vary for a particular primer from an initial value of 1 to 5 to 1 to 100, the former leading to dextrans of lower molecular weight than the latter. If the primer itself is extremely polymolecular it will cause polymolecularity in the dextran product. The concentration of the primer may decrease during the reaction as a consequence of participating in the synthesis reaction. However, dextran of such low molecular weight as to render it suitable for primer action may also be formed during the course of reaction.

In the synthesis reaction the dextransucrase enzyme employed in the present invention may be prepared in accordance with the method disclosed in applications, Serial No. 215,623 and 256,586 filed by Koepsell, Kazenko, Jeanes, Sharpe and Wilham and by Tsuchiya and Koepsell, respectively. The enzyme may be used in concentrated or isolated forms, or more conveniently the culture filtrate remaining after removal of the bacterial cells may be used. Moreover, the culture liquor may be used without removal of the bacterial cells, although it is preferred in that event that the cells will have been rendered inactive under the conditions of our synthesis reaction. The concentration of the enzymes in the polymerization affects the time required for complete reaction and also the molecular weight and yield and polymolecularity of the product. The preferred concentration of dextransucrase is about 30 to 100 units per milliliter of synthesis mixture, although ranges of 20 to 400 units per milliliter afford satisfactory results. The dextran sucrase concentration may be considerably lower than 20 units per milliliter, as illustrated in Example 7, where, in the first of the three runs, 16,000 units were employed in a liter of synthesis mixture. Inasmuch as the culture filtrate rich in synthesizing enzymes may contain varying amounts of endogenous primers or dextran degrading, or modifying, enzymes which can produce primers during the course of reaction, different sources of dextransucrase may require slight adjustments in the reaction conditions in order to form products of desired molecular weight. However, in our process we prefer that the enzyme concentration not be altered to any great extent as a means for controlling the molecular weight of the product even though variation in the enzyme concentration will affect the molecular weight of the product.

The concentration of sucrose in the reaction may vary over wide limits, from lower than 1 percent to as high as 20 percent. Higher sucrose concentrations induce the formation of lower molecular weight products, probably as a consequence of endogenous primer production and the increasing endogenous fructose concentration. In the operation of the process a higher sucrose concentration can be compensated for by using a lower primer to sucrose ratio. The sucrose concentration may be permitted to decrease continuously during the synthesis, the sugar being added initially to reaction mixtures and being acted upon by the enzymes. Alternatively, the sucrose concentration may be maintained at constant levels during the course of the reaction by the use of dialysis procedures or by the continuous addition of sucrose during the course of the reaction. The degree to which the sucrose concentration is held constant, or in fixed ratio to the alternate glucosyl acceptor and dextransucrase concentrations may control polymolecularity of the dextran product. We prefer to operate our process at initial 10 percent sucrose concentration, adjust the primer to sucrose concentration according to the desired molecular weight of the product, and allow the concentration of sucrose and primer to decrease in the normal fashion during the course of the reaction as they are converted to dextran.

EXAMPLE 1

Dextransucrase enzyme and maltodextran were admixed in solutions of the concentration indicated in the table below. One hundred ml. portions of these solutions were adjusted to about pH 5.0 and placed in dialysis membrane sacks. The sacks were then placed in 900 ml. of 1-percent sucrose solution and the solutions agitated at 25° C. for 48 hours. During this period fructose, which was formed inside the sacks, dialyzed to the outer solution, and sucrose dialyzed from the outer solution to the solution inside the sacks. The resulting products were evaluated by centrifugal fractionation, and the molecular weights determined as listed in Table I. Analytical ultracentrifugal results showed that the reaction mixtures contained high and low molecular weight components separated by a wide gap in sedimentation rates. Centrifugation of reaction mixture at 40,000 g. for 4 hours separated the high and low molecular weight components.

The maltodextran, employed as glucosyl acceptor, was prepared in accordance with our copending application, first mentioned previously. It possessed a molecular weight of about 8,000. Each product produced from this maltodextran exhibited a very sharp and narrow molecular weight range, being even sharper than the molecular weight range obtained by repeated fractionation of hydrolyzed dextran.

Table I

| No. | Dextransucrase, units/100 ml. | Maltodextran, g./100 ml. | $i^*$ | Molecular weight | Yield, grams |
|---|---|---|---|---|---|
| A | 10,000 | .29 | 0.54 | 620,000 | 2.3 |
| B | 10,000 | .59 | 0.33 | 135,000 | 2.5 |
| C | 10,000 | 1.18 | 0.28 | 86,000 | 2.7 |

*Inherent viscosity determined at relative viscosity of approximately 1.25.

EXAMPLE 2

The foregoing example was repeated, using sucrodextran as acceptor substance. The results are tabulated in Table II. The sucrodextran was obtained by enzymic synthesis in a high sucrose system as disclosed in our copending application Ser. No. 276,033, filed March 11, 1952, previously referred to. It possessed a lesser degree of molecular homogeneity than the maltodextran employed in Example 1. Ultracentrifugal analysis showed a correspondingly broader range of molecular weight for the products.

Table II

| No. | Dextransucrase, units/100 ml. | Sucrodextran, g./100 ml. | $i$ | Molecular weight | Yield, grams |
|---|---|---|---|---|---|
| A* | 10,000 | 0 | 2.04 | 50,000,000 | 0.1 |
| B | 10,000 | .29 | 0.46 | 370,000 | 2.3 |
| C | 10,000 | .59 | 0.21 | 47,000 | 2.2 |
| D | 10,000 | 1.18 | 0.19 | 40,000 | 2.0 |

*Yield of low molecular weight product negligible. Molecular weight given is that of high molecular weight component.

EXAMPLE 3

The procedure of Example 1 was repeated, except that the maltodextran used as acceptor substance varied in molecular weight, that used in flask C being larger than that used in flask B; and that used in flask B being larger than that used in flask A.

*Table III*

| No. | Dextransucrase, units/100 ml. | Maltodextran, g./100 ml. | Maltodextran, approx. M. W. | i | Molecular weight | Yield, grams |
|---|---|---|---|---|---|---|
| A | 10,000 | .59 | 4,000 | 0.25 | 68,000 | 1.8 |
| B | 10,000 | .59 | 8,000 | 0.35 | 180,000 | 1.9 |
| C | 10,000 | .59 | 10,000 | 0.42 | 290,000 | 2.4 |

EXAMPLE 4

The procedure of Example 1 was repeated, except that the concentration of dextransucrase was varied as shown in Table IV.

*Table IV*

| No. | Dextransucrase, units/100 ml. | Maltodextran, mg./100 ml. | i | Molecular weight | Yield, grams |
|---|---|---|---|---|---|
| A | 5,000 | .59 | 0.24 | 62,000 | 1.8 |
| B | 10,000 | .59 | 0.31 | 110,000 | 2.4 |
| C | 20,000 | .59 | 0.33 | 135,000 | 3.0 |

EXAMPLE 5

To 200 ml. solutions of fructose and enzyme were added slowly concentrated sucrose solutions so that the sucrose was almost instantaneously converted to dextran and fructose. The dextransucrase concentration was sufficiently high, and the sucrose solution added very slowly, dropwise over a 24 hour period, so that the sucrose concentration was essentially zero at all times. The essentially complete and instantaneous conversion of sucrose during the culture course of the synthesis was ascertained by reducing power measurements. Furthermore, the concentrations of the sucrose solutions were such that if the sucrose were completely and instantaneously converted during the course of addition, the fructose concentrations in the reaction mixtures were maintained at the desired levels throughout the experiment. The pH was held at 5.0 by the use of 0.01M acetate buffer in both the initial fructose, enzyme solutions and in the sucrose solutions which were added. The reactions were conducted at 25° C. and the solutions agitated mechanically.

The fructose concentration in reaction mixture A was held at 2.5 percent, in reaction mixture B at 5 percent, and in reaction mixture C at 10 percent throughout the course of the experiment. Each mixture contained 84,000 dextransucrase units. To reaction mixture A was added 1800 mls. of a 4.75 percent sucrose solution, to reaction B was added 1800 mls. of a 9.5 percent sucrose solution, and to reaction mixture C was added 1800 mls. of a 19.5 percent sucrose solution.

At the termination of the synthesis reactions the apparent yields and the approximate molecular weights of the dextrans produced were determined by fractional ethanol precipitation. To 20 ml. aliquots of reaction mixtures, warmed to approximately 45° C., were added graded amounts of alcohol. After these solutions had stood at 25° C. for 40 hours they were centrifuged, and polarimetric measurements were made for the nonprecipitated dextran in the supernatant liquors. By difference from the amount of total dextran present the amount of dextran precipitated at each ethanol concentration was determined. The results were calculated on the basis that enzymatically synthesized NRRL B-512 dextran has a $[\alpha]_D^{20}$ of +200 degrees in water and of +215 degrees in formamide. The results are shown in Figure 1. In general, high molecular weight (>1,000,000) dextran precipitates at relatively low methanol or ethanol concentrations (<40%) in contrast to low molecular weight polymer which precipitates at higher alcohol levels.

Examination of the precipitation curves shown in Figure 1 indicates that as the fructose concentrations in the reaction mixtures were increased the formation of high molecular weight dextran fraction was decreased with a concomitant increase in the formation of low molecular weight fraction. Thus, in these reaction mixtures the formation of the low molecular weight dextran was favored by high amounts of fructose despite the fact that the sucrose concentration was essentially zero.

EXAMPLE 6

An enzymatic synthesis mixture was prepared as follows: Dextransucrase concentrate from the culture filtrate of a *Leuconostoc mesenteroides* fermentation and an aqueous solution of maltodextran having an average molecular weight of about 15,000 was made up to 800 ml. with water, and 200 ml. of a 50-percent (w./v.) sucrose solution was added dropwise so that 100 g. of sucrose was added. The ratio of the weight of primer to the total weight of sucrose added was 1:10. The amount of dextransucrase employed for each gram of sucrose was 320 units. The pH of the synthesis mixture was held at 5.0 with 0.01M acetate buffer. The temperature at which the reaction was conducted was 24° C. Toluene was used to prevent the growth of contaminating bacteria. The reaction was permitted to proceed until the sucrose content became minimal. The reaction mixture was centrifuged at 40,000×g. for 4 hours to separate the high and low molecular weight components. The components were purified by two precipitations from methanol. The average molecular weight of the separated components was determined by light scattering. The above was repeated three itmes under identical conditions with the exception that the quantity of maltodextran primer was reduced by half each time giving primer to sucrose weight ratios of 1:20, 1:40, and 1:80, respectively.

*Table V*

| Primer sucrose | High molecular weight fraction | | Low molecular weight fraction | |
|---|---|---|---|---|
| | Yield percent theoretical | Molecular weight | Yield percent theoretical | Molecular weight |
| 1:10 | 24.5 | 235×10⁶ | 77.4 | 73,500 |
| 1:20 | 18.8 | 244×10⁶ | 72.5 | 123,000 |
| 1:40 | 34.1 | 267×10⁶ | 67.7 | 490,000 |
| 1:80 | 29.4 | 274×10⁶ | 40.2 | 1,150,000 |

EXAMPLE 7

The procedure of Example 6 was repeated using the same type of maltodextran as primer but varying the amount of dextransucrase. A primer to total sucrose weight ratio of 1:10 was employed. The reaction was performed at dextransucrase concentration of 160 units per gram of sucrose added and then repeated at 320 units and at 640 units per gram of sucrose added. The pH of the mixtures and the temperature at which the reactions were conducted were essentially similar to those in Example 6. Toluene was also used.

*Table VI*

| Enzyme concn. | High molecular weight fraction | | Low molecular weight fraction | |
|---|---|---|---|---|
| | Yield percent theoretical | Molecular weight | Yield percent theoretical | Molecular weight |
| Units/g. sucrose: | | | | |
| 160 | 13.1 | 166×10⁶ | 74.2 | 184,700 |
| 320 | 5.9 | 139×10⁶ | 79.2 | 99,700 |
| 640 | 6.6 | 119×10⁶ | 80.2 | 81,000 |

EXAMPLE 8

The procedure of Example 7 was repeated using the same type of maltodextran as primer but varying the manner of addition of sucrose. A primer to total sucrose weight ratio of 1:10, and a dextransucrase concentration of 320 units per gram of total sucrose was employed.

*Table VII*

| Mode of sucrose addition | High molecular weight fraction yield | Low molecular weight fraction | |
|---|---|---|---|
| | | Yield | Molecular weight |
| Instantaneous | 11.6 | 65.4 | 75,900 |
| Dropwise: Over 4-hour period | 12.3 | 76.6 | 45,600 |
| Over 8-hour period | 6.9 | 67.3 | 56,100 |
| Over 32-hour period | 15.5 | 61.2 | 45,400 |

EXAMPLE 9

An enzymatic synthesis mixture was prepared as follows: To 33.5 gallons of a clarified culture liquor assaying 50 dextransucrase units per ml. from a *Leuconostoc mesenteroides* fermentation were added 33.3 pounds sucrose and 3.3 pounds maltodextran primer similar to that used in Example 6. The final volume of the reaction mixture was 40 gallons. The ph of the reaction mixture was adjusted to pH 5.0. The reaction was conducted at 13° C. Toluene was used as in Example 6. The reaction was permitted to proceed until the sucrose content became minimal. The dextran synthesized was recovered by methanol precipitation at 60 percent. The precipitated material was redissolved in water to give a dextran concentration of 5 percent. The dextran thus obtained was fractionated by reprecipitating again between 42 and 50 percent methanol. The yield of dextran obtained was 3.9 pounds and the average molecular weight determined by light scattering was 72,500.

EXAMPLE 10

Two 400 ml. reaction mixtures containing 16,000 dextransucrase units, 6 grams of primer (low molecular weight dextran fraction obtained by fractional methanol precipitation from a previously conducted enzymatic polymerization carried out under conditions essentially similar to the present experiment), and 40 grams of sucrose were prepared. The pH of solutions were maintained at pH 5.0 by 0.01M acetate buffer. Contaminating bacterial growth was inhibited by the addition of small amounts of toluene to the reaction mixtures. Reaction mixture A was held at 30° C. and reaction mixture B at 15° C. for 8 hours. At the termination of the experiment enzymatic activity in these reaction mixtures was stopped by heating at 100° C.

The apparent yields and approximate molecular weights of dextrans synthesized were determined by fractional solvent precipitation in a manner essentially similar to that described in Example 5. Instead of ethanol, methanol was used as the precipitating agent. The results are shown in Figure 2.

Figure 2:
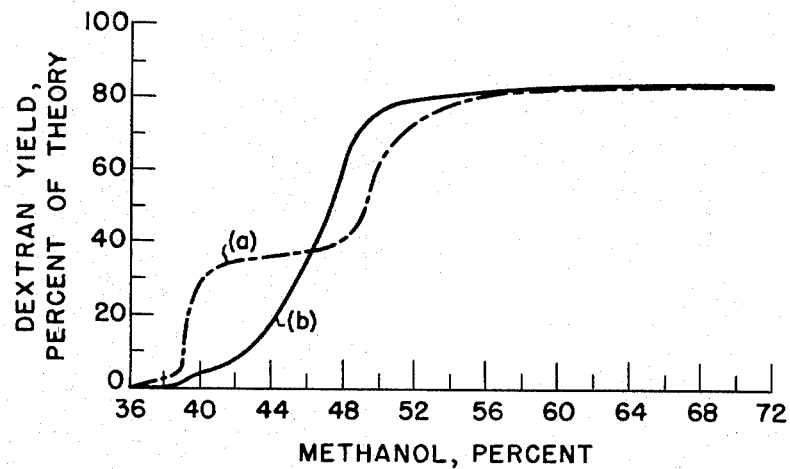

Examination of Figure 2 shows that the formation of the high molecular weight dextran fraction was suppressed with concomitant increased formation of polysaccharides with intermediate molecular weight by lowering the temperature of the reaction from 30° C. to 15° C. Past experience has shown that dextran with methanol precipitation characteristics of the intermediate molecular weight fraction, under the precipitation conditions used, has an average molecular weight in the range of 50,000 to 300,000 as checked by the light scattering procedure. The lower molecular weight of the intermediate molecular weight fraction of reaction mixture A as compared to the intremediate molecular weight fraction of reaction B (as shown by the shift of the upper portion of curve A to the right) is probably a consequence of the fact that less glucosyl units are available for the formation of the intermediate molecular weight fraction of reaction mixture A than of reaction mixture B due to the formation of relatively larger amounts of the high molecular weight fraction in reaction mixture A.

We claim:

1. The method for producing dextran of intermediate molecular weight which comprises adding as dextran primer a glucose polymer containing principally alpha linkages between the glucosyl groups and having a molecular weight within the range of 5,000 to 30,000 to dextransucrase enzyme in aqueous solution and adding also thereto sucrose, the weight ratio of primer substance to total sucrose substance being within the range of 1:5 to 1:100.

2. The method of claim 1 in which the concentration of dextransucrase in the reaction mixture is within the range of 20 to 400 units per ml., where a unit of dextransucrase is defined as the amount of dextransucrase which will convert one mg. of sucrose to dextran in one hour at pH 5.0 and 30° C.

3. The method of claim 1 in which the sucrose is added substantially all at one time, and the initial concentration is approximately 10 percent.

4. The method comprising interacting in an aqueous system dextransucrase, sucrose, and one of the group consisting of sucrodextran, maltodextran, and isomaltodextran, continuing the interaction to substantial decrease in sucrose concentration of the system, and recovering dextran of intermediate molecular weight from the reaction mixture by differential precipitation with a lower alkanol.

5. The method of claim 4 in which the primer substance is sucrodextran, i. e., low molecular weight dextran produced in reaction mixtures with initially high sucrose concentrations.

6. The method of claim 4 in which the primer substance is maltodextran.

7. The method of claim 4 in which the primer substance is isomaltodextran.

8. The method comprising interacting in an aqueous system dextransucrase, sucrose, and maltodextran of a molecular weight within the range of 5,000 to 30,000 maintaining the system until the sucrose has decreased to a substantial amount, recovering dextran from the reaction mixture by differential precipitation with a lower alkanol, separating the dextran into an intermediate molecular weight fraction and a fraction having a molecular weight within the range of 5,000 to 30,000 and reintroducing the latter into an aqueous system comprising dextransucrase and sucrose to synthesize more dextran of intermediate molecular weight.

9. The method of claim 8 in which the ratio of maltodextran to initial sucrose concentration in the synthesis mixtures is within the range of 1:5 to 1:100.

10. The method of claim 1 in which the sucrose is added gradually so as to maintain a constant level of sucrose in the system.

11. The method of clam 1 in which the ratio of sucrose to primer is maintained constant by the graduated addition of each and in which the ratio of sucrose to primer to dextransucrase is also maintained constant.

References Cited in the file of this patent

Hehre et al.: Jour. Biol. Chem., 163, (1946), (Article pages 221–233), pages 221–222. QP–501–J7. Scientific Library.

Evans et al.: Bacterial Polysaccharides, Sugar Research Foundation, Inc., New York, April 1947, Sci. Report Series No. 6, pages 211, 216, 217, 228 to 230. (Copy in Division 63.) 195–31.

Hehre et al.: Jour. Bact., 55 (1948) pages 197–208. Pages specifically relied upon are 204–205. QR–1–J8. Sci. Lib.